United States Patent [19]

Jung

[11] Patent Number: 4,985,080

[45] Date of Patent: Jan. 15, 1991

[54] DRY MORTAR MIXTURE

[75] Inventor: Fritz Jung, Vienna, Austria

[73] Assignee: Allgemeine Baugesellschaft-A.Porr Aktiengesellschaft, Vienna, Austria

[21] Appl. No.: 418,816

[22] Filed: Oct. 4, 1989

Related U.S. Application Data

[63] Continuation of Ser. No. 96,351, Aug. 10, 1987, abandoned.

[51] Int. Cl.$^5$ ................................................ C03C 7/00
[52] U.S. Cl. .................................... 106/672; 106/677; 106/724; 106/795; 106/820
[58] Field of Search ................ 106/85, 86, 90, 119, 106/122, 672, 677, 724, 795, 820

[56] References Cited

U.S. PATENT DOCUMENTS

| | | | |
|---|---|---|---|
| 2,254,252 | 9/1941 | Wertz | 106/662 |
| 2,516,342 | 7/1950 | Randall et al. | 106/90 |
| 2,733,995 | 2/1956 | Robinson | 106/733 |
| 3,447,937 | 6/1969 | Hersey et al. | 106/89 |
| 3,502,490 | 3/1970 | Ware | 106/90 |
| 3,649,317 | 3/1972 | Houseknecht | 106/90 |
| 3,942,994 | 3/1976 | Murray et al. | 106/89 |
| 4,441,944 | 4/1984 | Massey | 156/71 |

FOREIGN PATENT DOCUMENTS

| | | |
|---|---|---|
| 303217 | 8/1984 | Fed. Rep. of Germany . |
| 3303217 | 8/1984 | Fed. Rep. of Germany . |
| 632568 | 1/1928 | France . |
| 1492242 | 8/1967 | France . |
| 355902 | 9/1931 | United Kingdom . |
| 1592348 | 7/1981 | United Kingdom . |

OTHER PUBLICATIONS

German Industrial Standard Din 53 445, 1986.
McGraw-Hill Encyclopedia of Science & Technology, vol. 1, p. 222, ©1976.

Primary Examiner—William R. Dixon, Jr.
Assistant Examiner—Anthony J. Green
Attorney, Agent, or Firm—Spencer & Frank

[57] ABSTRACT

A dry mortar mix based on an inorganic bonding agent and optionally additives, plastics, fibres, and other conventional concrete additives is proposed especially to protect concrete structures and/or to eliminate surface damage to such structures. In addition to the inorganic bonding agent, the dry mortar mix contains a granular additive to increase alkalinity, this having a reaction speed that is a considerably lower than that of the granular bonding agent. This "reserve alkalinity" serves to counteract the diffusion of $CO_2$ and $SO_2$ from the air into the concrete, and the damage to the concrete that is attendant on such diffusion.

37 Claims, 4 Drawing Sheets

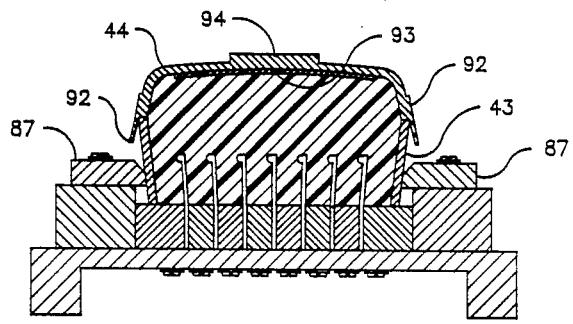
FIG 13
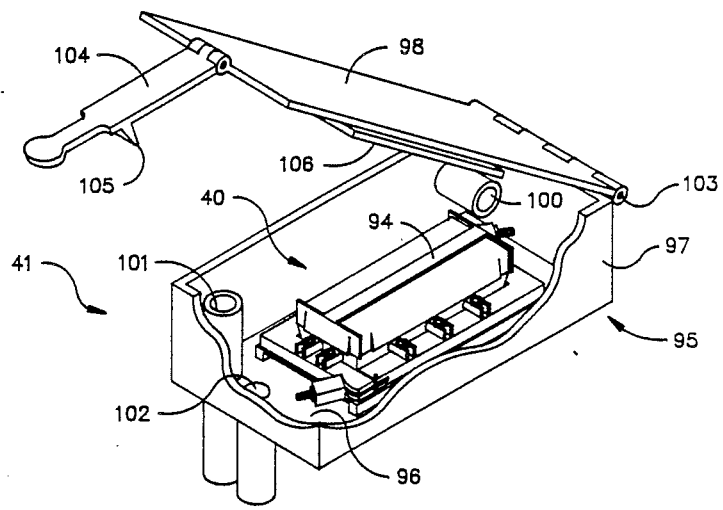
FIG 14
FIG 15
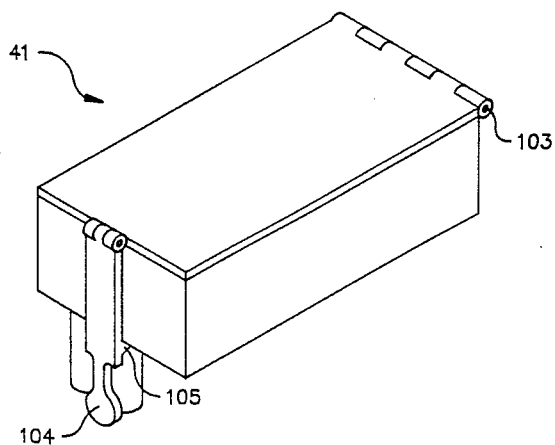
FIG 16
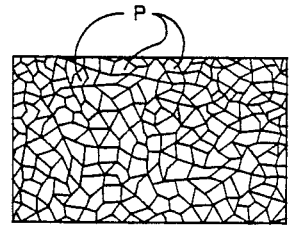

DRY MORTAR MIXTURE

This application is a continuation of application Ser. No. 07/096,351, filed Aug. 10, 1987 now abandoned.

FIELD OF THE INVENTION

The present invention relates to a dry mortar mixture for coating vertical, horizontal, or inclined surfaces, this mixture consisting of at least one inorganic, hydraulic or non-hydraulic bonding agent and, optionally, of at least one additive, a plastic that is in powder form, dispersed in liquid, or in liquid form, an additive to increase resistance to freezing and freeze-thaw cycling, a colouring agent, fibres and/or other additional additives, for example, natural or artificial pozzuolane, blast-furnace slags and/or conventional concrete additives such as liquifiers, pouring agents, sealants, corrosion inhibitors, and the like.

TECHNOLOGY REVIEW

Increased surface damage has been noted in structures, particularly those of concrete, this damage being caused by the increased diffusion of $CO_2$ and $SO_2$ from the atmosphere into those zones that are close to the surface of the concrete. The diffusion of $CO_2$ leads to carbonatisation, to a subsequent loss of alkalinity, and finally to corrosion of steel within the concrete. The diffusion of $SO_2$ leads to the formation of gypsum or ettringite and thus to undesirable blowing of the cement. These problems are exacerbated as a result of subsequent treatment that is often inadequate. This can involve the formation of a high level of porosity in those zones contiguous to the surface, which further facilitates the diffusion of $CO_2$ and $SO_2$.

The problems set out above are made more acute by the increasing use of thin-wall structural components that are frequently applied to heat-insulating layers, for example, sandwich panels, and by the high stress levels generated by temperature differentials.

In order to eliminate these disadvantages, there is a need for a high-strength coating that has both good adhesive properties on the base and a high level of resistance to gas diffusion. In part, these objectives can be achieved by plastic coatings or brushed-on applications. However, plastic coatings or applications entail the disadvantages that, if they become damaged, the attack continues immediately on the old front, and also that the physical properties of the coating, in particular with regard to thermal expansion, water permeability, aging (embrittlement) and the like vary greatly from the properties of the concrete.

A further attempt to overcome the disadvantages set out above has been proposed using a concrete-like layer that can be applied. Although the so-called mineral sealing slurries of cement, sand, and water, or the so-called flexible slurries of cement, sand, plastic, and water, used to this end behave better than purely plastic coatings, they can be applied in coatings of only limited thickness, which means that in the majority of cases, gas diffusion cannot be adequately inhibited, or that the "alkali deposit" generated by such slurries cannot compensate for the loss of alkalinity.

West German OLS 28 56 764 describes a concrete or mortar mixture that contains at least one inorganic bonding agent as well as a plastic that displays low-temperature adhesiveness, at least one part of the additives being formed of particles or pellets of organic material, in particular of plastic. Such a composition is said to display a high level of resistance to changes in temperature while remaining fully efficacious, and in addition to this, should display greatly improved elastic behaviour at temperatures below 0° C. compared to previously used concretes or mortars.

The basis of West German OLS 28 27 382 is a similar task, namely the production of structural elements and/or coatings of concrete, these being resistant to impact, abrasion, and freeze-thaw cycling. The proposed solution is a bonding agent or a concrete or mortar that consists of at least one hydraulic bonding agent, as well as of at least one plastic with a specific Tmax value, and which can optionally contain bitumen and/or tar.

According to West German OLS 26 32 691 or Austrian Patent 353 156, a cement with increased terminal strength is proposed. In order to achieve this objective, a cement of portland cement clinker and marl clinker is proposed, this containing low-lime mineral phases that can be hydrated.

On the other hand, Austrian Patent 305 871 proposes an expanding cement. The process for the production of this expanding, lime-free portland cement that is described is based on maintaining a portland cement clinker in a specific temperature range for a predetermined time and mixing gypsum and, if desired, the usual additives with, optionally, a portland cement clinker of conventional composition to the portland cement clinker previously treated in this way.

Even using the above described means one cannot achieve the objective of the present invention, which is to create a high-strength coating that has both good adhesiveness to the base and a high level of resistance to gas diffusion, and which introduces a sufficient alkaline deposit, in particular to compensate for the loss of alkalinity.

The present invention seeks to provide a dry mortar mixture for coating vertical, horizontal, or inclined surfaces, this leading to a sufficiently strong layer having a low modulus of elasticity, it being possible to apply this in thicker layers of, for example, 10 mm, which has a high level of resistance against $CO_2$ and $SO_2$ diffusion from the air into the concrete, and which results in an adequate alkali deposit and displays a high level of adhesiveness to a base, but which differs relatively little from the base, for example, a concrete base, as far as its physical properties are concerned.

SUMMARY OF THE INVENTION

Thus this invention provides dry mortar mixture of the type described broadly above, characterized in that in addition it contains a granular additive that increases the level of alkalinity, is effective for a long period, the granular additive also having a significantly lower reaction speed than the inorganic bonding agent.

As an inorganic bonding agent, the dry mortar mixture according to the present invention contains portland cement of the usual composition, iron portland cement, blast furnace slag cement, sulfate cement resisting white cement, aluminous cement, modified portland cement on a basis of $11CaO.7 Al_2O_3.CaF_2$; quick setting cement, Brunauer cement, Grenoble cement, hydraulic or extra-hydraulic lime, Roman lime, white or fat lime, and/or caustic magnesite.

DESCRIPTION OF THE PREFERRED EMBODIMENTS

Figure 1:
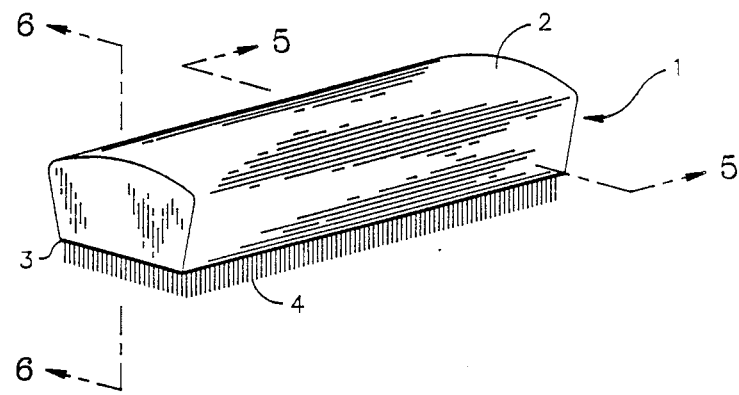

It is advantageous there be a mixture of 30 to 95% cement with 70–5% lime, preferably 50–90% cement with 35–10% lime present in the dry mortar mixture as an inorganic bonding agent.

A sand mixture can be advantageously contained in the mixture according to the present invention, this being present as a conventional additive, the maximum grain size between 1 and 8 mm being matched to the intended thickness that is to be used, and the grain size distribution of the sand being so selected that for the maximum grain size 4 mm to 8 mm it falls in the usable or especially in the favourable range according to Austrian Standard B 3304, and for another maximum grain size it falls in a corresponding range.

According to a preferred embodiment of the dry mortar mix according to the present invention, at a hardening temperature of 20° C. the reaction of the granular additive that increases alkalinity should first reach to over 25%, preferably to over 40%, in particular over 60% at a hardening age of the dry mortar mix of more than 28 days.

In the dry mortar mix according to the present invention, a coarse grain portland cement clinker, preferably with a tricalcium aluminate content of below 5%, especially below 3%, and most especially below 1%, is suitable the granular additive used to increase the level of alkalinity. Because of its large grain size, this clinker reacts very slowly. Each time the coating is wetted, the clinker releases fresh calcium hydroxide and thus refreshes the alkalinity and retards corrosion. Even cracks can to a certain extent be closed by such slow hydration, as can be seen in some concrete pipes.

Granular blast-furnace slag, fly ash, special dolomite lime or hydraulic lime can be contained in the dry mortar mix according to the present invention as the additive that increases the level of alkalinity. According to a further advantageous embodiment, a portland cement clinker with a high dicalcium silicate content of more than 30%, preferably over 45%, in particular over 55%, can be contained in the dry mortar mix according to the present invention as the alkalinity reserve. The slow reaction speed that is desired is achieved by this high content of dicalcium silicate.

If, according to the present invention, coarse grain portland cement clinker is used as the alkalinity reserve, its grain size is best between 0.06 to 8 mm, preferably from 0.06 to 4 mm, in particular from 0.1 to 1 mm.

Furthermore, it has been found to be advantageous to select the grade line for the conventional additives so that the volume of the granular materials that increase the alkalinity is considered when setting the grade line for the conventional additive.

With reference to quantitative composition, in one advantageous embodiment, the dry mortar mix according to the present invention is characterized in that it contains 2–75%, preferably 5–50%, in particular 10–25% coarse granular portland cement clinker relative to the mass of the dry mortar mix.

In addition, the dry mortar mix can contain a plastic that is present in powder form, dispersed in liquid and/or in dissolved form. The proportion of plastic can vary within wide limits, depending of the modulus of elasticity that is desired. As an example, insofar as a very high breaking elongation appears necessary, the proportion of plastic can amount to 60% by mass or even higher, so that the inorganic bonding agent acts, at least in part, as a filler. However, in these mixtures, too, the maintenance of the alkalinity is provided by the addition of the granular additive (coarse grain portland cement clinker), as provided for according to the present invention. Of course, as a rule—particularly for reasons of cost—a plastic content of 1–10% mass or from 2–4% mass is adequate, and for this reason this range seems preferable. In any case, a plastic that is present in powder form, dispersed in liquid and/or dissolved, having a $T_{max}$ value determined according to DIN 53 445 of less than $-5°$ C. and preferably less than $-8°$ C., in particular less than $-12°$ C., is used.

Solid bodies that either contain pores and/or in which pores are formed during the hardening process, can be contained in the dry mortar mix as the additives that increase frost resistance and resistance to ice-melting salt. Any known pore forming additive may be used. The pore volume amounts to 0.3–6%, preferably 0.5–4%, in particular 0.5–2% relative to the volume of the dry mortar mix. The pores that are either contained or generated in the solid bodies that are added are best of a predominant diameter of 20–200 $\mu$m, preferably 25–100 $\mu$m, in particular 30–70 $\mu$m (micrometers).

The dry mortar mix can be reinforced with fibres in a very simple manner, for example, with glass fibres, synthetic fibres, or coated or stainless steel fibres, and can be filled with pigmenting agents. As an example, inorganic and/or organic colouring pigments in a quantity of 0.05–2%, preferably 0.1–1.5% relative to the volume of dry mortar mix can be used as colouring additives.

The dry mortar mix according to the present invention is characterized even at a greater layer thickness of, for example, 10 mm, by a high degree of adhesiveness to the base, displays physical properties (coefficient of thermal expansion, water permeability, aging, and behaviour at different temperatures) like those of the base, and because of the plastic additive is highly resistant to $CO_2$ and $SO_2$ diffusion. Because of the content of coarse grain clinker, its alkalinity is constantly refreshed, whereby in particular corrosion of the steel reinforcement is hindered.

Most surprisingly, it was also found that a mortar modified according to the present invention has a greatly increased resistance to chlorine diffusion; this is of great importance during chloride attack, as when ice-melting salt is used. Appropriate variation of the cement/lime ratio and the help of plastic additives can determine the modulus of elasticity to the desired extent, thereby making it possible to achieve a very high breaking elongation. In addition to this, a coating that is produced from the dry mortar mix according to the present invention is easily worked, e.g., by spraying, trowelling, or the like, and either a thick or thin coating can be applied. The mortar is applied to the surface that is to be protected, either by hand or by means of a conventional plastering machine, preferably by a spiral pump machine, and then worked. In order that the full alkalinity increasing effect of the mortar according to the present invention is felt, it has been shown to be effective to select a coating thickness of approximately 0.5 to several centimeters, preferably 1.0 to 1.5 cm. Naturally, a lesser thickness can be applied, although this will result in less protection against corrosion. It is expedient that after being worked, the mortar be given a coating to protect it against evaporation. This secondary treatment film can be applied by spray or by brush, or the like. If the film displays increased resistance to $CO_2$ and/or $SO_2$ diffusion, it will further increase the corrosion effect of the dry mortar.

The following examples describe the invention in greater detail.

TABLE 1

| | Composition of coating (calculated water-free) in % mass, (Thickness, 8 mm) | | | | | | Average increase carbonatisation in original depth of carbonatisation from 10 mm to ... mm after | | |
|---|---|---|---|---|---|---|---|---|---|
| | | Coarse grain PZ clinker | | Normal sand | | | | | |
| No. | PZ 275 (H) | 0.1/1 | 1/4 | 0.1/1 | 1/4 | Plastic | 1 year | 2 years | 3 years |
| 0 | No coating | | | | | | 10 | 19 | 30 |
| 1 | 30% | — | — | 25% | 45% | — | 3 | 14 | 24 |
| 2 | 27.5% | — | — | 24% | 45% | 3.5% | 2 | 10 | 18 |
| 3 | 27.5% | 4% | — | 20% | 45% | 3.5% | 2 | 8 | 14 |
| 4 | 27.5% | 8% | — | 16% | 45% | 3.5% | 1 | 5 | 8 |
| 5 | 27.5% | 20% | — | 4% | 45% | 3.5% | 1 | 3 | 4 |
| 6 | 27.5% | 24% | 30% | — | 15% | 3.5% | 1 | 2 | 2 |
| 7 | 31% | 24% | 30% | — | 15% | — | 1 | 4 | 4 |
| 8 | 31% | 24% | 45% | — | — | — | 2 | 4 | 5 |
| 9 | 29.5% | 24% | 30% | — | 15% | 1.5% | 2 | 5 | 5 |
| 10 | 29.5% | 20% | — | 4% | 45% | 1.5% | 2 | 4 | 4 |
| 11 | 29.5% | 20% | — | 4% | 45% | 1.5% | 1 | 3 | 4 |
| 12 | Commercially available anticorrosion coating of plastic | | | | | | 5 | 10 | 19 |

EXAMPLE 1

Concrete panels measuring 20×20×10 cm were given various coatings, at an age of 8 months. The concrete had been produced with PZ 275 (H), had a cement:water ratio of 0.67, and at the time the carbonatisation coatings were applied had an average depth of carbonatisation of 10 mm. The types of coatings and their effects on the continued increase in the depth of carbonatisation can be seen in Table 1. The coated panels had been stored in the open air in an urban environment.

A powdered acrylic resin dispersion was used; the clinker in tests 3 to 9 was a portland cement clinker with a dicalcium silicate content of 35%; for test 10 this was 48%, and for test 11, 56%.

As can be seen from Table 1, the addition of the coarse grain clinker reduced the progress of carbonatisation considerably, particularly in the later stages. The effect was clearly greater than was the case using commercially available coatings to protect against corrosion.

EXAMPLE 2

A ferroconcrete facade panel measuring 2×5 m (water: cement ratio 0.65) was divided into 10 equal sections, each 50 cm wide, all of which were exposed to the weather in the same way. In each instance, the concrete coating was 10 mm thick. At an age of two years—when the depth of carbonatisation was a uniform 5–6 mm—eight of these sections were coated as shown in Table 2. Observation of the progress of carbonatisation and the behaviour of the reinforcing steel are set out in the results presented in Table 2.

As can be seen from this table, coating the panels with the coarse grain clinker according to the present invention resulted in a considerable reduction in the rate of carbonatisation and reduced corrosion of the reinforcing steel.

EXAMPLE 3

Equal concrete test pieces measuring 12×12×36 cm (water:concrete ratio 0.64) were used for this test. At an age of 6 months, test piece 1 was provided with a commercially available anticorrosion coating that was brushed on. Test piece 2 was given a 9 mm thick coating, composed in accordance with the present invention, of 30% PZ 275 (H) portland cement, 28% coarse grain clinker with a grain size of 0.2/1 mm with a tricalcium aluminate content of 2.2%, 3% copolymer plastic based on styrene-butadiene, 37.5% limestone sand ¼ mm and 1.5% conventional flow agent (calculated water-free). Test piece 3 was given a coating that differed from that used for test piece 2 only in that, instead of the PZ 275 (H) portland cement, a portland cement with a tricalcium aluminate content of 0% was used. Test piece 4 remained uncoated.

TABLE 2

| | Composition of coating (calculated water-free) in % mass, (Thickness, 8 mm) | | | | | | Depth of carbonatisation (mm) after application of coating after | | | | Condition of reinforcing steel | | |
|---|---|---|---|---|---|---|---|---|---|---|---|---|---|
| | | Coarse grain PZ clinker | | Normal sand | | | | | | | | | |
| No. | PZ 275 (H) | 0.15/1 | 1/4 | 0.1/1 | 1/4 | Plastic | 0 | 1 year | 2 years | 3 years | 1a | 2a | 3a |
| 0# | No coating | | | | | | 5–6 | 13 | — | — | sR/A | — | — |
| 1 | 45% | — | — | 25% | 30% | — | 5–6 | — | 15 | — | O | sR/A | — |
| 2 | 40.5% | — | — | 25% | 30% | 4.5% | 5–6 | — | 11 | — | O | sR/A | — |
| 3 | 40.5% | 25% | — | — | 30% | 4.5% | 5–6 | — | — | — | O | O | O |
| 4 | Commercially available coating I (plastic based) | | | | | | 5–6 | — | 12 | — | O | sR/A | — |
| 5 | Commercially available coating II (plastic based) | | | | | | 5–6 | — | 14 | — | O | sR/A | — |
| 6 | 40.5%* | 25% | — | — | 30% | 4.5% | 5–6 | — | — | — | O | O | O |
| 7 | 40.5% | 25%+ | — | — | 30% | 4.5% | 5–6 | — | — | — | O | O | O |

TABLE 2-continued

| | | Composition of coating (calculated water-free) in % mass, (Thickness, 8 mm) | | | | | Depth of carbonatisation (mm) after application of coating after | | | | Condition of reinforcing steel | | |
|---|---|---|---|---|---|---|---|---|---|---|---|---|---|
| | | Coarse grain PZ clinker | | Normal sand | | | | | | | | | |
| No. | PZ 275 (H) | 0.15/1 | 1/4 | 0.1/1 | 1/4 | Plastic | 0 | 1 year | 2 years | 3 years | 1a | 2a | 3a |
| 8 | 40.5%** | 25% | — | — | 30% | 4.5% | 5-6 | — | — | — | O | O | O |

*Quick-setting cement
**30% clinker + 10.5% hydrate of lime
+ Low C3A clinker
sR - large cracks
A - flaking
O - no visible damage
- double section All of the test pieces were exposed to an outside atmosphere containing a somewhat enriched level of SO₂ (in the vicinity of a garbage incinerator). After eighteen months, considerable cracks and incipient decomposition were observed in test piece 4. Damage could also be seen in test piece 1 (considerable arching at the edges and on the corners, numerous cracks). There were only two hair-line cracks, each 3 or 4.5 mm long in test piece 2. There was no visible damage to test piece 3.

The coatings according to the present invention contributed greatly to protecting the test pieces.

EXAMPLE 4

Concrete test pieces measuring 12×12×36 cm (water: cement ratio 0.64) were used for test purposes. At an age of six months these were coated with a 10-mm thick layer composed of 30% 275(H) portland cement, 38% limestone sand ¼ mm, and 29.5% "fine grain 0.1/1 mm with reserve alkalinity." 0.5% of a copolymer plastic based on styrene-butadiene, 1% fibres, 0.4% methyl-cellulose, and 0.6% thixotropic agent were used as extra additives. The following substances were used as fine grain 0.1/1 mm with reserve alkalinity for the test pieces as shown:

Test piece 1: blast furnace slag A
Test piece 2: blast furnace slag B
Test piece 3: fly ash
Test piece 4: hydraulic limestone (grain size 0.25/1)
Test piece 5: special dolomite limestone
Test piece 6: portland cement clinker
Test piece 7: limestone sand (test sample)

The chemical composition of these substances was as follows (annealing loss-free state):

TABLE III

| | $SiO_2$ | $Al_2O_3$ | $FeO + Fe_2O_3$ | CaO | MgO |
|---|---|---|---|---|---|
| Blast furnace slag A | 33% | 12% | 0.6% | 45% | — |
| Blast furnace slag B | 36% | 7% | 0.5% | 48% | — |
| Fly ash | 28% | 11% | 5.3% | 37% | — |
| Hydraulic lime | 11% | 5% | 3% | 76% | — |
| Special dolomite limestone | 2% | 2% | 1% | 56%* | 40% |

*As indicated by X-ray diffraction testing, the total CaO is present as inert, insoluble $CaCO_3$. The alkalinity increasing effect of the special dolomite limestone is attributable to the content of reactive MgO.

All the test pieces were exposed to an outside atmosphere with enriched CO₂ levels (exhaust outlet of a vehicle garage). At the beginning of the comparison testing, at an age of six months, i.e., when the mortar coating was applied, the test pieces displayed an average depth of carbonatisation of approximately 5 mm. Twenty months after application of the mortar coating in comparison piece 7 the mortar coating was carbonated to full depth, and carbonatisation in test piece 7 itself had risen on average to 11 mm. In all the other pieces, a carbonatisation depth of 2-4 mm was established in the mortar coating; in no instance had the depth of carbonatisation exceeded 5 mm.

EXAMPLE 5

For this test, as in Example 4, four concrete test pieces measuring 12×12×36 cm (water:cement ratio 0.64) were used for the tests. At an age of 6 months these were coated with a 10-mm thick layer. The coating mortar for this layer was composed of 25% 275(H) portland cement, a further 25% alkalinity reserve granulate with a grain size of 0–0.25 mm, of 15% limestone sand 0.2–0.8 mm, and of 35% limestone sand 0.8–1.4 mm. The following substances were used for alkalinity reserve in the test pieces as indicated below:

Test piece 1: portland cement clinker with 58% dicalcium silicate;
Test piece 2: limestone sand (test sample);
Test piece 3: here, a commercially available anticorrosion coat was brushed on in place of the mortar coating.

All of the test pieces were exposed to an outside atmosphere with enriched levels of SO₂ and CO₂ (in the vicinity of a garbage incinerator). At the beginning of the test, at an age of 6 months, i.e., when the protective coating was applied, the test pieces displayed an average depth of carbonatisation of approximately 4 mm. Two years after application of the protective coatings the concrete of test piece 2 was carbonated to its full depth; the carbonatisation in test piece 2 had progressed on average to 9 mm. In test piece 3, too, the depth of carbonatisation had increased on average to 8 mm. In test piece 1 a carbonatisation depth of only 1-2 mm could be detected on the body itself there was at the time the protective mortar was applied a layer of carbonatisation on average 4 mm thick, with adequate reserve alkalinity still available, which could be established by dyeing with phenolphthalein solution. Thus, not only had carbonatisation been avoided by the reserve alkalinity in the mortar coating, but it had also been possible to build up adequate alkalinity in the concrete that had originally undergone carbonatisation and been coated with the mortar.

In contrast to the substance that increases alkalinity described in the previous examples, the portland cement clinker used in the above example was ground relatively fine. The reaction time, which was slow in comparison with the other portland cement clinker present in the others in the bonding agent, was achieved not by a coarser grain size, but by an extraordinarily higher dicalcium silicate content of 58%.

I claim:

1. A dry mortar mixture for preparing a corrosion resistant coating on surfaces of concrete structures, consisting essentially of:
   at least one inorganic bonding material selected from the group consisting of cement, lime and mixtures thereof;
   from about 2 to 75 weight % relative to the weight of said dry mortar mix of a coarse grain size portland cement clinker;
   from about 1 to 60 weight % relative to the weight of said dry mortar mix of a plastic in powder form, adapted to be dispersed or dissolved in liquid, said plastic having a $T_{max}$ value of less than $-5°$ C.; and
   an effective amount of a pore forming additive to increase resistance to frost or ice-melting salts.

2. A dry mortar mix as set forth in claim 1, wherein said coarse grain portland cement clinker has a dicalcium silica content of more than 30%.

3. The dry mortar mix as set forth in claim 1, wherein said inorganic bonding material consists essentially of a mixture of from about 30% to 95% cement with about 70% to 5% lime.

4. A dry mortar mix as set forth in claim 1 wherein said coarse grain portland cement clinker has a dicalcium silicate content of more than 45%.

5. A dry mortar mix as set forth in claim 1, wherein said coarse grain portland cement clinker has a dicalcium silicate content of more than 55%.

6. A dry mortar mix as set forth in claim 1, wherein said coarse grain portland cement clinker has a grain size of from 0.06 to 8 mm.

7. A dry mortar mix as set forth in claim 1, containing at least about 5 to 50 weight percent coarse grain portland cement clinker.

8. A dry mortar mix as set forth in claim 1, containing at least about 10 to 25 weight % coarse grain portland cement clinker.

9. A dry mortar mix as set forth in claim 1, wherein said inorganic bonding material consists essentially of a mixture of from about 50% to 90% cement with about 50% to 10% lime.

10. A dry mortar mix as set forth in claim 2 wherein said inorganic bonding material consists essentially of a mixture of from about 65% to 90% cement with about 35% to 10% lime.

11. A dry mortar mix as set forth in claim 1, wherein the alkalinity increases over 40%.

12. A dry mortar mix as set forth in claim 1, wherein the alkalinity increases over 60%.

13. A dry mortar mix as set forth in claim 1, wherein the tricalcium aluminate content is less than 3%.

14. A dry mortar mix as set forth in claim 1, wherein the tricalcium aluminate content is less than 1%.

15. A dry mortar mix as set forth in claim 2, wherein the dicalcium silicate content is more than 45%.

16. A dry mortar mix as set forth in claim 2, wherein the dicalcium silicate content is more than 55%.

17. A dry mortar mix as set forth in claim 3 wherein said inorganic bonding material consists essentially of from about 50% to 90% cement with about 50% to 10% lime.

18. A dry mortar mix as set forth in claim 3, wherein said inorganic bonding material consists essentially of about 65% to 90% cement and about 35% to 10% lime.

19. A dry mortar mix as in claim 1, wherein said coarse grain size portland cement clinker has a tricalcium aluminate content of less than 5 weight % relative to the weight of said coarse grain portland cement.

20. A dry mortar mix as set forth in claim 19, wherein said inorganic bonding material consists essentially of about 50% to 90% cement and about 50% to 10% lime.

21. A dry mortar mix as set forth in claim 19, wherein said inorganic bonding material consists essentially of about 65% to 90% cement and about 35% to about 10% lime.

22. A dry mortar mix as set forth in claim 19 wherein the tricalcium aluminate content is less than 3%.

23. A dry mortar mix as set forth in claim 19 wherein the tricalcium aluminate content is less than 1%.

24. A dry mortar mix as set forth in claim 4, wherein the dicalcium silicate content is more than 45%.

25. A dry mortar mix as set forth in claim 4, wherein the dicalcium silicate content is more than 55%.

26. A dry mortar mix as set forth in claim 5, wherein the dicalcium silicate content is more than 45%.

27. A dry mortar mix as set forth in claim 5, wherein the dicalcium silicate content is more than 55%.

28. A dry mortar mix as set forth in claim 1, wherein the grain size is from 0.06 mm to 4 mm.

29. A dry mortar mix as set forth in claim 1, wherein the grain size is from 0.1 mm to 1 mm.

30. A dry mortar mix as set forth in claim 6, wherein the grain size is from 0.06 mm to 4 mm.

31. A dry mortar mix as set forth in claim 6, wherein the grain size is from 0.01 to 1 mm.

32. A dry mortar mix as set forth in claim 8, wherein the clinker content is from 5 to 50%.

33. A dry mortar mix as set forth in claim 8, wherein the clinker content is from 10 to 25%.

34. A dry mortar mix as set forth in claim 9, wherein said inorganic bonding material consists essentially of about 50% to 90% cement and about 50% to 10% lime.

35. A dry mortar mix as set forth in claim 9, wherein said inorganic bonding material consists essentially of about 65% to 90% cement and about 35% to 10% lime.

36. A dry mortar mix as set forth in claim 10, wherein said inorganic bonding material consists essentially of about 50% to 90% cement and about 50% to 10% lime.

37. A dry mortar mix as set forth in claim 10, wherein said inorganic bonding material consists essentially of about 65% to 90% cement and about 35% to 10% lime.

* * * * *

UNITED STATES PATENT AND TRADEMARK OFFICE
CERTIFICATE OF CORRECTION

PATENT NO. : 4,985,080

DATED : January 15th, 1991

INVENTOR(S) : Fritz JUNG

Figure 2:
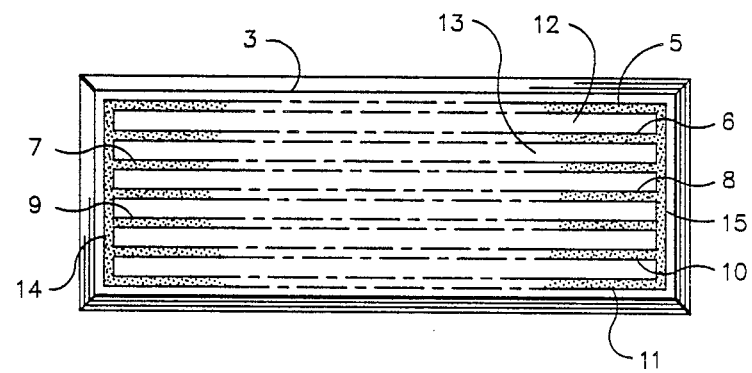
Figure 3:
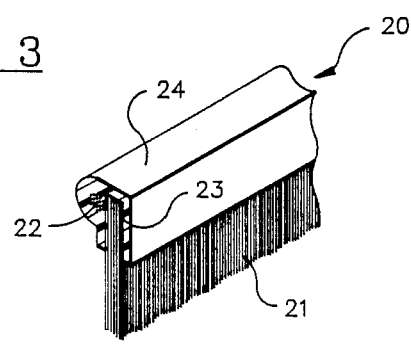
Figure 4:
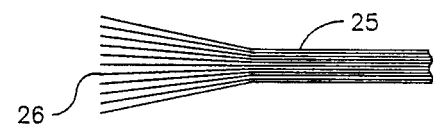
Figure 5:
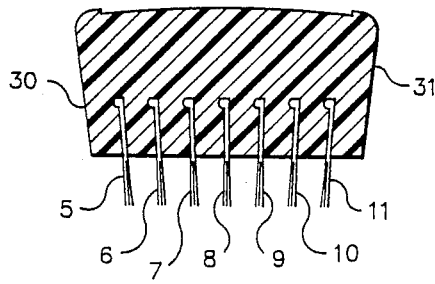
Figure 6:
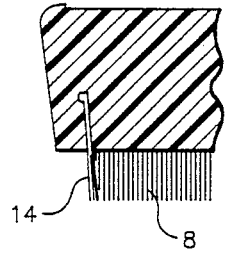
Figure 7:
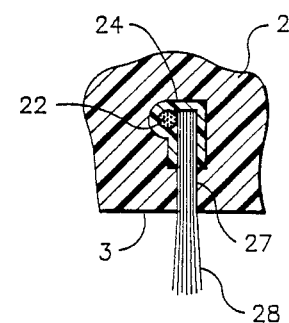
Figure 8:
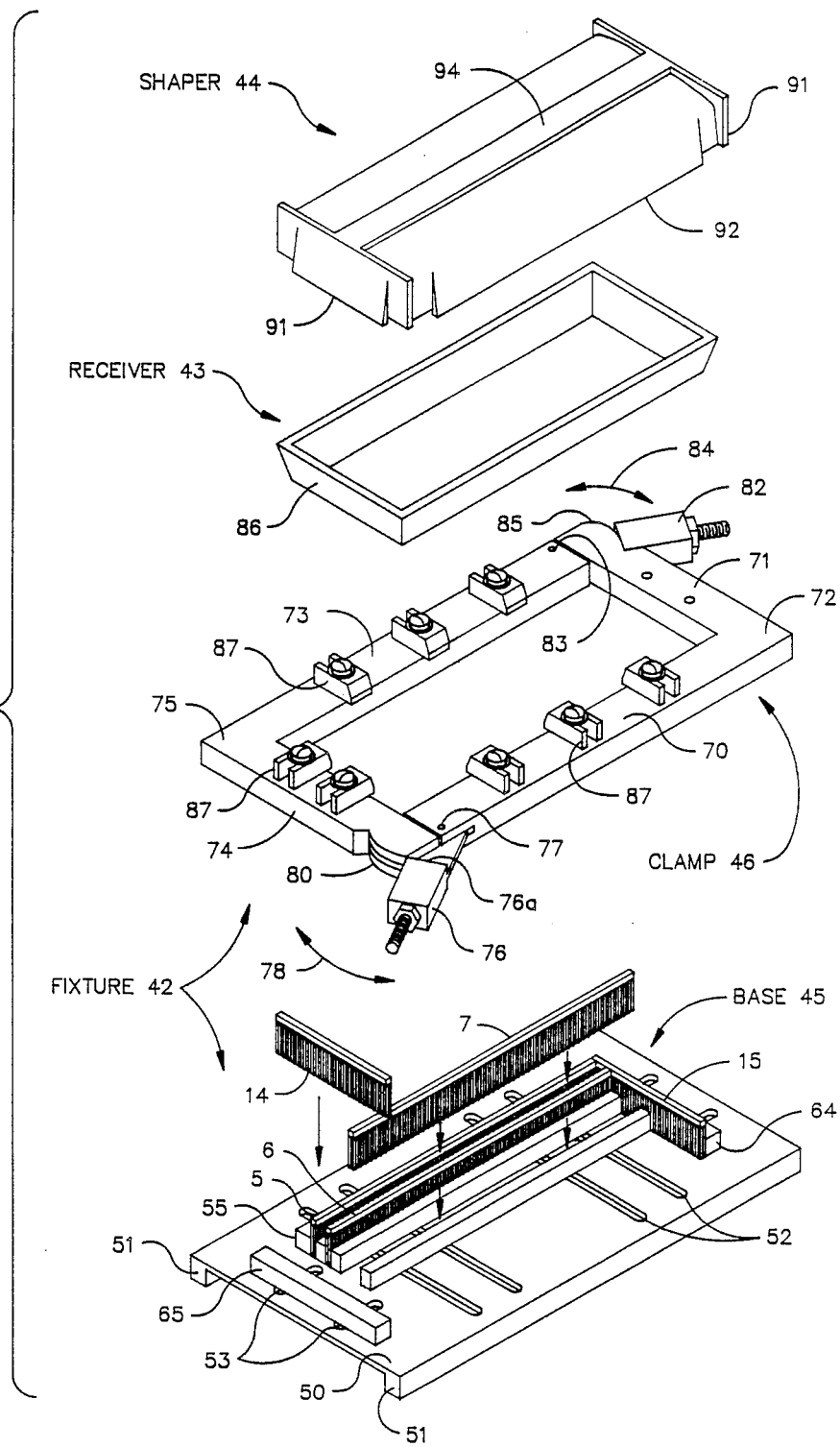
Figure 9:
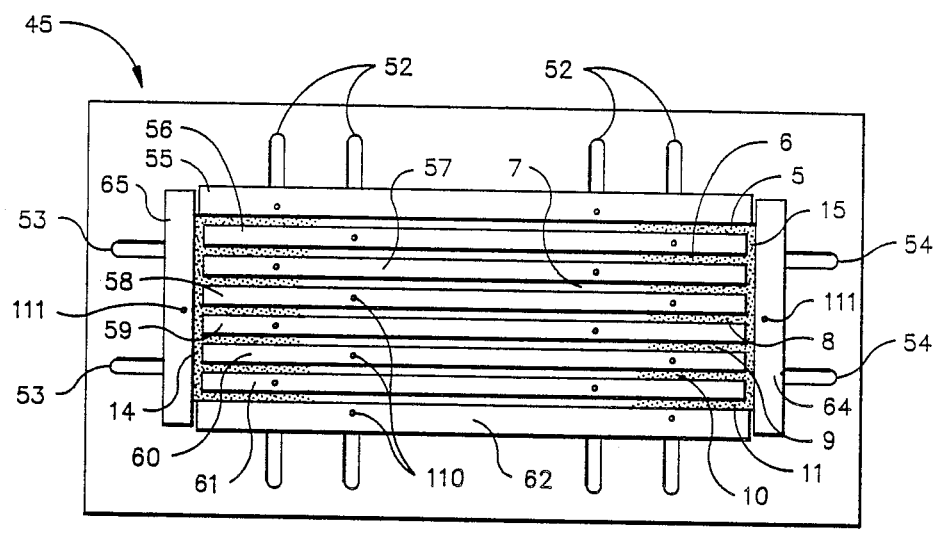
Figure 10:
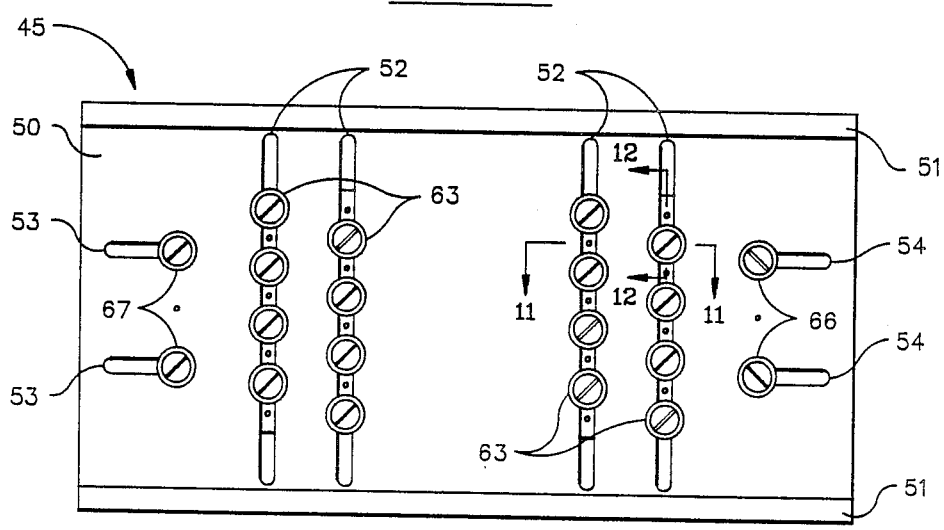
Figure 11:
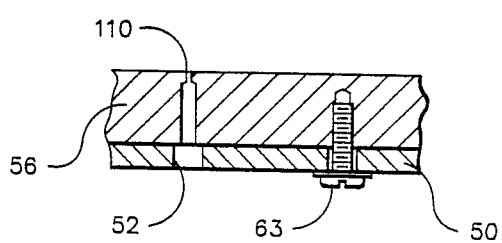
Figure 12:
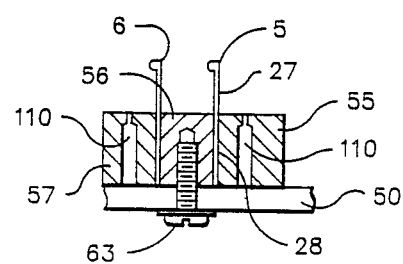

It is certified that error appears in the above-identified patent and that said Letters Patent is hereby corrected as shown below:

On the title page, below the Abstract, after "37 Claims," please change "4 Drawing Sheets" to --No Drawings--; and Delete Figs. 1-16 (Sheets 1-4).

The title page should be deleted to appear as per attached title page.

Signed and Sealed this

Twenty-ninth Day of October, 1991

Attest:

HARRY F. MANBECK, JR.

*Attesting Officer*    *Commissioner of Patents and Trademarks*

United States Patent [19]
Jung

[11] Patent Number: 4,985,080
[45] Date of Patent: Jan. 15, 1991

[54] DRY MORTAR MIXTURE

[75] Inventor: Fritz Jung, Vienna, Austria

[73] Assignee: Allgemeine Baugesellschaft-A.Porr Aktiengesellschaft, Vienna, Austria

[21] Appl. No.: 418,816

[22] Filed: Oct. 4, 1989

Related U.S. Application Data

[63] Continuation of Ser. No. 96,351, Aug. 10, 1987, abandoned.

[51] Int. Cl.$^5$ .............................................. C03C 7/00
[52] U.S. Cl. .................................... 106/672; 106/677; 106/724; 106/795; 106/820
[58] Field of Search ...................... 106/85, 86, 90, 119, 106/122, 672, 677, 724, 795, 820

[56] References Cited

U.S. PATENT DOCUMENTS

| | | | |
|---|---|---|---|
| 2,254,252 | 9/1941 | Wertz | 106/662 |
| 2,516,342 | 7/1950 | Randall et al. | 106/90 |
| 2,733,995 | 2/1956 | Robinson | 106/733 |
| 3,447,937 | 6/1969 | Hersey et al. | 106/89 |
| 3,502,490 | 3/1970 | Ware | 106/90 |
| 3,649,317 | 3/1972 | Houseknecht | 106/90 |
| 3,942,994 | 3/1976 | Murray et al. | 106/89 |
| 4,441,944 | 4/1984 | Massey | 156/71 |

FOREIGN PATENT DOCUMENTS

| | | |
|---|---|---|
| 303217 | 8/1984 | Fed. Rep. of Germany . |
| 3303217 | 8/1984 | Fed. Rep. of Germany . |
| 632568 | 1/1928 | France . |
| 1492242 | 8/1967 | France . |
| 355902 | 9/1931 | United Kingdom . |
| 1592348 | 7/1981 | United Kingdom . |

OTHER PUBLICATIONS

German Industrial Standard Din 53 445, 1986.
McGraw-Hill Encyclopedia of Science & Technology, vol. 1, p. 222, ©1976.

Primary Examiner—William R. Dixon, Jr.
Assistant Examiner—Anthony J. Green
Attorney, Agent, or Firm—Spencer & Frank

[57] ABSTRACT

A dry mortar mix based on an inorganic bonding agent and optionally additives, plastics, fibres, and other conventional concrete additives is proposed especially to protect concrete structures and/or to eliminate surface damage to such structures. In addition to the inorganic bonding agent, the dry mortar mix contains a granular additive to increase alkalinity, this having a reaction speed that is a considerably lower than that of the granular bonding agent. This "reserve alkalinity" serves to counteract the diffusion of $CO_2$ and $SO_2$ from the air into the concrete, and the damage to the concrete that is attendant on such diffusion.

37 Claims, No Drawings